(12) United States Patent
Stava et al.

(10) Patent No.: US 6,274,845 B1
(45) Date of Patent: Aug. 14, 2001

(54) METHOD AND APPARATUS FOR ELECTRIC ARC WELDING

(75) Inventors: Elliott K. Stava, Sagamore Hills; Christopher Hsu, Mentor; Peter Nicholson, Sagamore Hills, all of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/685,824

(22) Filed: Oct. 11, 2000

Related U.S. Application Data

(62) Division of application No. 09/268,329, filed on Mar. 16, 1999, now Pat. No. 6,160,241.

(51) Int. Cl.[7] .................................................. B23K 9/095
(52) U.S. Cl. ................................. 219/125.12; 219/124.34
(58) Field of Search ............................ 219/125.12, 124.34, 219/130.21, 130.31, 130.32, 130.33

(56) References Cited

U.S. PATENT DOCUMENTS

| | | |
|---|---|---|
| 4,187,411 | 2/1980 | Bryce et al. . |
| 4,525,619 | 6/1985 | Ide et al. . |
| 4,533,817 | 8/1985 | Makimaa . |
| 4,631,385 | 12/1986 | Rothermel . |
| 5,001,326 | 3/1991 | Stava . |
| 5,171,966 | * 12/1992 | Fukuoka et al. ................ 219/125.12 |
| 5,270,516 | 12/1993 | Hamamoto et al. . |
| 5,351,175 | 9/1994 | Blankenship . |
| 5,676,857 | 10/1997 | Parker . |
| 5,961,863 | 10/1999 | Stava . |

OTHER PUBLICATIONS

*A New Wire Stickout Control Algorithm in GMA Welding*, P. Orszagh, Y.C. Kim, K. Horikawa, publication date unknown.

* cited by examiner

*Primary Examiner*—Clifford C. Shaw
(74) *Attorney, Agent, or Firm*—Vickers, Daniels & Young

(57) ABSTRACT

An electric arc welding apparatus for depositing molten metal from an advancing welding wire into a weld puddle in an open root between two juxtapositioned plates where the root extends in a welding path and is formed by converging walls terminating in generally parallel walls spaced to define a gap, which apparatus comprises a contact holder with a wire outlet, a switching power supply directing welding current to the wire as the wire passes from the outlet toward the open root, with the advancing wire defining an electrode stick out between the contact holder and the weld puddle, a circuit for sensing the length of the stick out, and control means for adjusting the welding current as a function of the sensed stick out length.

13 Claims, 12 Drawing Sheets

FIG. 1
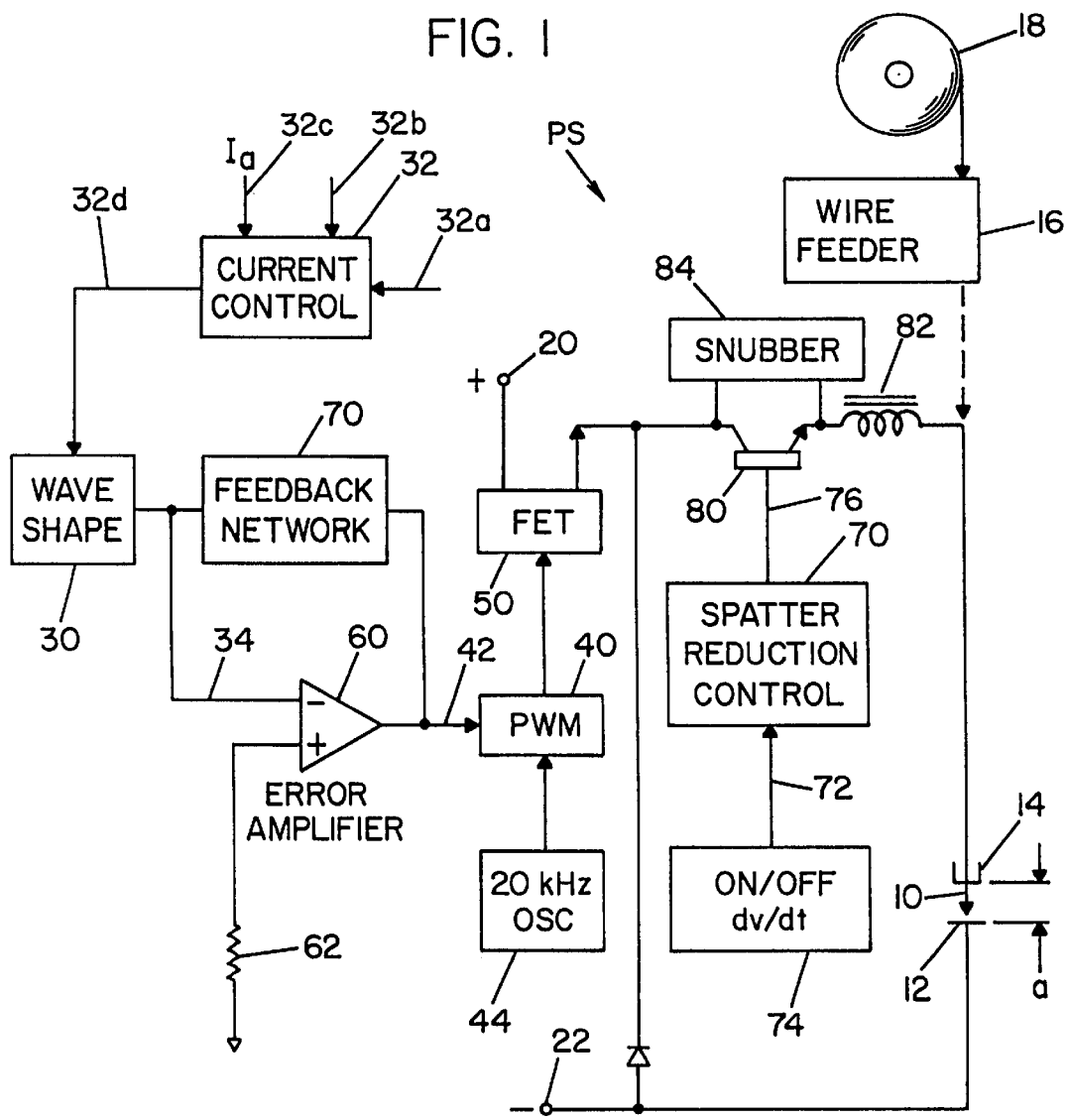
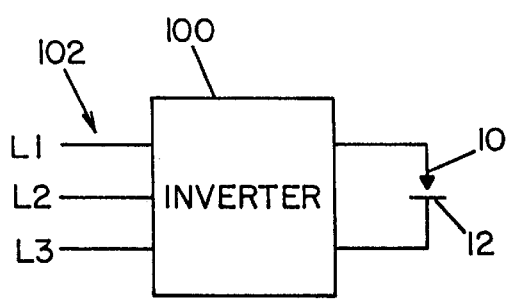
FIG. 1A
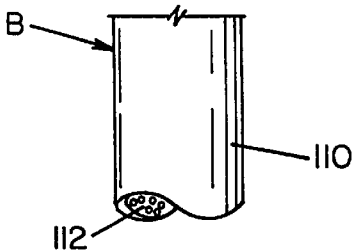
FIG. 1B

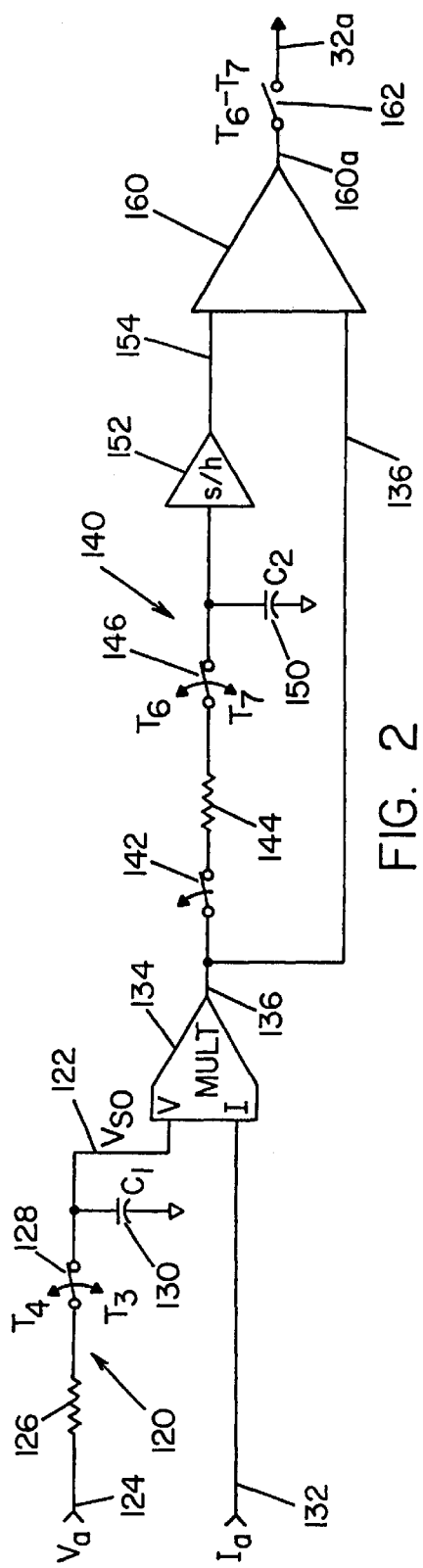
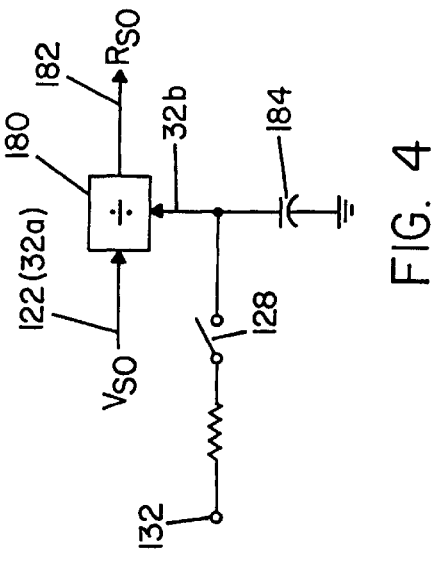
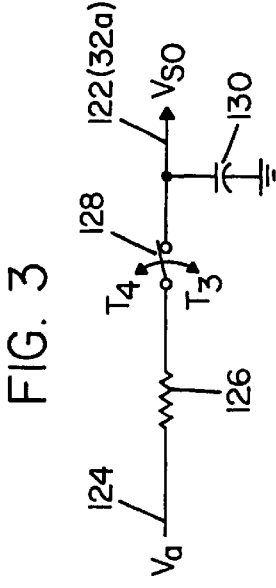
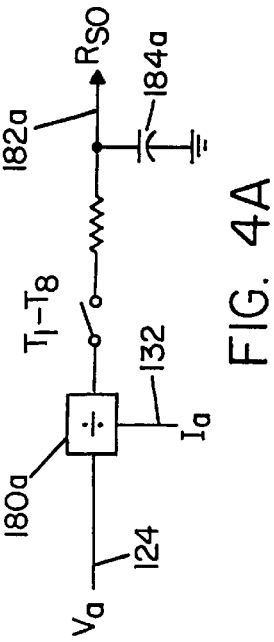
FIG. 2
FIG. 3
FIG. 4
FIG. 4A

METHOD AND APPARATUS FOR ELECTRIC ARC WELDING

This patent application is a divisional of application Ser. No. 09/268,329, filed on Mar. 16, 1999, now U.S. Pat. No. 6,160,241, incorporated herein by reference.

The present invention relates to the art of electric arc welding and more particularly to a method and apparatus for electric arc welding which is particularly applicable to use in pipe welding, especially during the root pass in an open root joint.

INCORPORATION BY REFERENCE

An electric arc welder of the short circuit type is known in the field as an STT welder sold by The Lincoln Electric Company of Cleveland, Ohio and generally described in the background of Stava U.S. Pat. No. 5,001,326, which patent is incorporated herein to illustrate details of the STT welder and certain features which are to be used in practicing the present invention. The invention uses a high frequency switching power supply, preferably an inverter. Various inverter based welders can be used; however, a representative welder is disclosed in Blankenship U.S. Pat. No. 5,351,175 incorporated herein as an inverter welder.

BACKGROUND OF INVENTION

The STT electric arc welder sold by The Lincoln Electric Company of Cleveland, Ohio has been used for pipe welding where a molten metal from an advancing welding wire is deposited into a weld puddle in an open root joint between two juxtapositioned ends of adjacent pipe sections. The open root joint extends around the pipes in a circular path, which path may vary somewhat by axial deviations. The joint between pipe sections is formed by converging walls terminating in generally parallel walls spaced from each other to define a separating gap, known as an open root. The gap between the ends of the pipe sections, or plates, is not a fixed distance so the welder as it progresses around the open root encounters a gap with a variety of spacings. As disclosed in Stava U.S. Pat. No. 5,001,326, the STT welder has a contact holder though which the advancing wire passes so the welding current can be directed through the holder to the advancing wire and then into the molten weld puddle formed between the ends of the pipe sections. This puddle bridges the gap to form the root bead of the pipe welding operation. The STT welder uses a high frequency switching power supply to create a distinct short circuit current wave shape. This frequency relates to the operating frequency of the power supply and not to the frequency of the weld process. The electrode stick out or extension in the welding field is the distance between the contact holder and the weld puddle. As the gap between the ends of the plates formed by the adjacent pipe sections vary, the puddle formed by the first pass of the electric arc welding in a pipe welding operation changes shape. This change presents known problems in a pipe welding process.

As disclosed in Stava U.S. Pat. No. 5,001,326, the objective of the high frequency switching power supply known as the STT electric arc welder is to maintain a uniform volume in the molten metal ball on the end of the electrode as the wire advances toward the molten puddle. This prior patent discloses how the control system of the STT can be used to detect and measure the actual wattage forming the molten metal ball on the end of the electrode. This wattage is set for an extension and is maintained from one welding cycle to the next. As the stick out of the electrode changes, the welding current is adjusted to maintain a constant wattage based upon a preset reference wattage obtained at the start of the welding operation. In this manner a constant sized ball is created during each welding cycle. When using the STT electric arc welder, if the welding current is not changed to compensate for changes in the electrode extension or stick out, the shorting frequency will change. This changing frequency is not the switching frequency of the power supply, but is the weld shorting frequency. As the electrode extension (stick out) is reduced, the volume of molten metal in the advancing ball is reduced and the arc length is slightly reduced. This reduction in the size of the molten metal ball causes the time between short circuits in the welding operation to be reduced. This increases the shorting frequency, as determined by the number of shorts per unit time. Conversely, if the electrode extension or stick out is increased, the heating of the electrode is increased. If there is no current adjustment, the volume of molten metal on the end of the advancing wire increases. This action slightly increases the arc length to increase the time between short circuits to decrease the shorting frequency of the welder. The frequency change during use of the STT for pipe welding has not been used as a measuring parameter.

The STT is used for pipe welding to allow manual control of penetration and heat into the puddle; however, it does not solve the problem experienced with variations in the width of the gap when laying the first bead in an open root joint. Stava U.S. Pat. No. 5,001,326 does teach a procedure for measuring the stick out during use of an STT welder for use in maintaining a given ball size. While the electrode or welding wire is short circuited, the voltage drop across the shorted electrode is measured and recorded. The value of the welding current is essentially fixed during this measurement. Consequently, the sensed or measured voltage is directly proportional to the stick out or extension of the welding wire. This measured extension voltage is averaged over several cycles and then stored in a memory, such as a capacitor. In the Stava patent, this stored value is multiplied by the peak current value during subsequent welding cycles. The result of this multiplication is a measurement of the watts during each welding cycle. Calculated wattage is stored in memory, such as a capacitor, and is referred to as a "reference wattage." This reference wattage is obtained at the start of the welding process based upon an adjusted stick out. Thereafter, the reference wattage is used for comparison with the instantaneous wattage. A control software program holds the instantaneous wattage at the reference wattage. This total control scheme, as shown in Stava U.S. Pat. No. 5,001,326, is used to maintain a fixed volume of molten metal on the end of the wire as it is advancing toward puddle during the short circuit condition, irrespective of changes in the stick out or extension. There is no teaching of changing the stick out during a welding process to control the welding process. There is no teaching of changing the heat generated during a single pass. Stick out or extension of the advancing wire is used to maintain a constant wattage during the wire melting portion of the welding cycle.

The use of a high frequency switching power supply such as the STT electric arc welder for pipe welding is well known. However, when laying the root bead during the first pass in the open root joint between the pipe sections, the power supply can not automatically compensate for changes in the gap between the pipe sections. When the gap is wide, the puddle falls through the gap. When the gap is narrow, the puddle does not penetrate the gap. Thus, manual intervention is required with the resulting variations. There is a need for controlling the welding operation during the initial bead in the open root joint of the type encountered in pipe welding or other heavy plate welding.

The STT welder sold by The Lincoln Electric Company is a short circuit arc welder which is operated by a high frequency switching network to create a current curve as shown in FIG. 4 of Stava U.S. Pat. No. 5,001,326. This welder is commercially successful; however, it does not have the same capabilities of a constant voltage welder wherein the weld puddle temperature can be controlled by merely changing the wire stick out or electrode extension. This is a limitation of a welder for creating the STT current curve. Consequently, puddle temperature, as important in pipe welding, is adjusted when using an STT welder by intervention or presetting of the weld currents. Even with this limitation, the STT welder is superior to a constant voltage weld which creates excessive puddle heat.

STATEMENT OF INVENTION

The present invention is directed toward an apparatus and method for laying the first bead in an open root joint of a plate welding process, such as in pipe welding. This method and apparatus uses a high frequency switching power supply, preferably the STT welder from The Lincoln Electric Company. The invention will be described with particular reference to this type of electric arc welders and use for the root bead in pipe welding; however, the invention is much broader and may be used with other electric arc welders used for open root pass such as the first pass between the ends of heavy plates and the ends of pipe sections. The invention can also be used during subsequent passes in the open root joint.

In accordance with the present invention, the electric arc welder automatically compensates for changes in the gap spacing. This adjustment does not maintain a constant wattage, as disclosed in the Stava patent incorporated by reference herein. This patent discloses one high frequency welder sold as the STT welder, together with a teaching of a circuit for measuring the stick out of the welding wire during the welding process. The ability to measure the stick out during the welding process is not used on the commercial STT, but is used in the preferred embodiment of the present invention. Variation in the gap experienced when laying the initial root bead in a pipe welding process can be determined by the instantaneous stick out. When welding an open root joint having a gap that varies in width, the molten metal puddle sags through the gap when the gap is wide. This physical phenomenon results in an increase in wire stick out. Such stick out can be detected by the circuitry illustrated in the Stava patent. Of course, several circuits can be used with different high frequency power supplies to measure instantaneous stick out. If the gap is too narrow, the initial root bead does not penetrate into the gap. The stick out is decreased. This reduced stick out is sensed by circuitry such as shown in the Stava patent when using the short circuit process. Thus, the present invention is the concept of measuring the instantaneous stick out to determine the gap between the plates in the welding process. The stick out measurement determines changes needed in the puddle heat. Thus, the welding current is increased when the gap is narrow and decreased when the gap is wide.

By using the stick out measurement, the invention can be used to profile the welding in the weld joint. If a serpentine welding process is being used, wherein the welding wire moves transversely across the gap during the welding process along the gap, the electrode extension varies as the wire approaches the diverging walls forming the joint. Thus, measurement of stick out provides information regarding the position of the weld head as it moves the electrode transversely in the open root welding process. A more generic definition of the invention is the use of the measured stick out during the welding process for controlling parameters of the welding process. Parameters being controlled are weld current or weld head direction, to name two.

The present invention is particularly applicable for pipe welding wherein the measurement of the stick out provides information on changes in the gap of the root opening and/or the position of the electrode relative to the center line of the root joint. As the root opening increases, the weld puddle tends to fall through the gap into the inside of the pipe. The present invention detects the beginning of this event by sensing an increase in the electrode stick out. This increased stick out is used to reduce the heat of the weld puddle by reducing the weld current. This is done by decreasing the background or peak current, or both currents. Thus, the weld puddle temperature is reduced. This causes solidification of the molten metal in the bead to prevent the metal from falling through the gap. When the root gap is reduced, the sensed electrode stick out is also reduced because the molten metal does not pass through the gap. The molten puddle accumulates on the top of the gap. Thus, when a decrease in the stick out is sensed, the current is increased to increase the heat in the molten metal puddle in the joint. The hotter puddle penetrates into the narrow gap to cause proper fusion of the plate ends along the total depth of the gap.

After the root pass has been laid, measurement of the stick out can be used for seam tracking in accordance with another aspect of the invention. The sensed stick out information is used by the mechanism moving the weld head back and forth. The outboard position of the weld head can be detected as a decrease in the electrode extension. When the weld head moves to the outside portion of the joint, the stick out is small. As the electrode is moved across the joint, the electrode extension will vary in length with the shortest at the outside of the joint. As the electrode reaches one side of the joint it is reversed to move toward the other side. The electrode stick out will first increase and then decrease. The use of stick out information controls the weld head mechanism by signaling when the transverse movement of the electrode or weld head should be stopped and reversed. This action generates the serpentine pattern of the weld head during the welding operation and allows joint tracking.

By utilizing stick out information, the electric arc welder of the present invention automatically senses changes in the gap that can cause undesired bead profiles. In addition, outboard positions of the electrode in a transverse direction with respect to the sloping or divergent side walls of the joint are detected for direction reversal at the proper position. These two separate functions are predicated upon measuring the stick out. Stick out measurement can be accomplished by a circuit dictated by the welding process being performed. In the short circuit process shown in Stava U.S. Pat. No. 5,001,326, an appropriate circuit is disclosed for meaning the stick out between the electrode holder and the molten metal of the weld puddle.

The present invention is used in both semi-automatic or automatic welding operations. The welding power or heat can be changed by using the invention. By changing the electrode extension during travel of the weld head along a joint, heat can be changed at selected locations in the joint. For example, while welding a joint by a robotic welder, if the geometry of the part is such that more or less heat is required at a certain location, the electrode extension as changed to adjust the heat of the welding operation. This use of the invention does not necessarily require changing the control settings of the welder. The settings remain fixed, but the desired stick out length is changed for control purposes. In accordance with another use of the present invention, stick out is used for seam tracking during one weld pass so weld head movement is actually controlled by the path of the joint. The path traversed by the weld head in one pass along the joint is stored in memory. Subsequent weld passes of the robotic welding equipment duplicates the path memorized during the first pass. Thus, subsequent passes of the welder follow the stored path of the first bead.

A primary aspect of the present invention is the measurement of the stick out or electrode extension during the welding operation in an open root welding procedure. The stick out value controls the current during the plasma portion of the welding operation by either controlling the maximum current, the background current, or other current. Indeed, an integration of the current used during the plasma portion of an STT welding cycle can be controlled in accordance with the sensed stick out or electrode extension. In an STT welder, the stick out measurements may also be sensed by the shorting frequency of the welder. By measuring the shorting frequency in an STT welding process, a signal representative of the electrode stick out is created. Thus, another aspect of the invention is measuring the shorting frequency of a short circuit welding operation and changing the arc welding current to maintain a nearly uniform shorting frequency.

In accordance with the present invention, an electric arc welding apparatus is provided for depositing a molten metal from an advancing welding wire into a weld puddle in an open root between two juxtapositioned plates. These plates can be the ends of pipe sections, which is the preferred use of the present invention. The joint defines a welding path and is formed by converging walls terminating in generally parallel walls spaced to define a gap at the root of the joint. The welding apparatus includes a contact holder with a wire outlet. A switching power supply directs a welding current to the wire as the wire passes from the outlet toward the root opening of the joint during the first bead of the welding operation. In accordance with the preferred embodiment of the invention, the switching power supply is a STT welder having a wave form as disclosed in Stava U.S. Pat. No 5,001,326. The advancing wire defines an electrode stick out between the contact holder and the weld puddle. In accordance with the invention, the length of the stick out is sensed and the welding current is adjusted as a function of the sensed stick out length. Preferably, this function is an inverse relationship with an increased stick out resulting in a decreased current, or heat into the puddle. When using the STT welder, the power supply is a short circuit arc welder having different current levels which alternate between a shorting condition and an arcing or plasma condition. The heat of the weld is controlled during the arcing condition and the stick out is measured during the short circuit condition using appropriate circuit, the preferred one of which is illustrated in Stava U.S. Pat. No. 5,001,326.

The broad aspect of the present invention is the measuring of the stick out or extension and using this to control the heat in the weld puddle. As an alternative application of the invention, the stick out is used to control other parameters in the welding process.

In accordance with the preferred embodiment of the invention, the stick out is measured instantaneously and is used in a microprocessor software program to select a desired current wave form from a look up table, ROM, RAM, PROM mathematical calculation or other algorithm. The output of the look up table ROM, RAM, PROM or software algorithm is then used in a software error amplifier to compare the actual current, which maybe the integration of the total current during the welding cycle, to adjust the weld current to the desired level dictated by the sensed stick out. The current adjustment changes the STT wave form by changing peak current, background current, etc.

In accordance with still another aspect of the present invention, there is provided a method for depositing molten metal from an advancing welding wire into a weld puddle at the open root joint between two juxtapositioned plates of the type created by flat large plates or the ends of pipe sections. The open root extends in a welding path and is formed by converging walls terminating in generally parallel walls spaced to define a gap. The method involves the acts of directing welding current to the wire by a high frequency switching power supply as the wire advances toward the gap in the open root by first sensing the length of the stick out of the wire and then adjusting the welding current as a function of the sensed stick out length. The preferred implementation of this method involves the function wherein the stick out and current are inversely related. As the stick out increases, the current decreases. In a like manner, as the stick out decreases, the current increases. This concept is used to compensate for differences in the gap along the joint of an open root welding process, such as the first pass in a pipe welding process.

In accordance with another aspect of the invention, the sensed stick out or electrode extension is used to reverse the movement of the weld head carrying the welding wire holder and moving in a serpentine pattern. This concept is used after the root bead has been laid. When using this aspect of the invention, the length of the stick out is sensed as the weld head carrying the wire is moved in a first direction transverse of the joint. When the sensed stick out is at a given reduced value, the transverse direction of the wire is reversed. This reversal is repeated at the opposite side of the joint so the electrode moves back and forth across the joint. This feature of the invention is extremely advantageous when the gap or root opening increases or decreases or when the path of the joint is not consistent. By using this aspect of the invention, the welding head tracks the actual path of the joint. Such joint tracking is not obtained when the transverse movement of the weld head automatically reverses at a fixed position, irrespective of the geometry of the joint.

In accordance with a further aspect of the present invention, a short circuit welder creating the STT current curve is modified to measure the stick out and then adjust the weld current to change the puddle temperature. this is an important change so the low heat STT welder can operate similar a constant voltage arc welder by adjusting puddle temperature by merely changing wire stick out.

In accordance with still another aspect of the present invention, the welding wire used in the welding apparatus and method is a flux cored electrode. Consequently, shielding gas is not required during the pipe welding operation. This is an advantage in remote geographical areas where pipe welding is normally performed.

The primary object of the present invention is the provision of an apparatus and method for controlling the heat directed to a puddle in an opened root welding process by sensing the stick out of the electrode and adjusting the current for changing the heat in the weld puddle. This objective solves the problem presented by variations in the gap at the open root of the joint.

Yet another object of the present invention is the provision of an apparatus and method, as defined above, which apparatus and method automatically compensates for changes in the gap of an open root joint when welding the first root pass, especially in a pipe welding operation.

Still a further object of the present invention is the provision of an apparatus and method, as defined above, which apparatus and method allows the weld head carrying the electrode to track the open root joint between two plate ends or pipe sections, irrespective of the contour or path of the joint.

Another object of the present invention is the provision of an apparatus and method, as defined above, which apparatus and method can be easily implemented to compensate for different profiles and different gaps in open root welding, as well as certain weld passes after the first root pass.

Yet a further object of the present invention is the provision of an apparatus and method, as defined above, which apparatus and method is particularly applicable with a high frequency switching power supply and specifically a power supply with the pulse wave form of the STT welder.

A further object is the provision of an apparatus and method as defined above where a short circuit arc welder can change puddle temperature by merely changing wire stick out.

Yet another object of the invention is the provision of an apparatus and method, as defined above, which apparatus and method is used with a short circuit weld process as disclosed in Stava U.S. Pat. No. 5,001,326.

These and other objects and advantages will become apparent from the following description taken together with the accompanying drawings.

BRIEF DESCRIPTION OF THE DRAWINGS

FIG. 1 is a wiring diagram of a power supply used in practicing the present invention which is similar to the power supply disclosed in Stava U.S. Pat. No. 5,001,326;

FIG. 1A is a block diagram of the preferred embodiment of the present invention wherein the high frequency switching power supply is an inverter such as disclosed in Blankenship U.S. Pat. No. 5,351,175;

FIG. 1B is a schematic pictorial view of a flux cored electrode may be used in the preferred embodiment of the present invention;

FIG. 2 is a wiring diagram of the circuit or software program for creating the signal used to adjust the heat of the puddle as the wire stick out changes with a start up adjustment;

FIG. 3 is a wiring diagram of the circuit or a software program used in the preferred embodiment of the present invention for creating a voltage signal representing the actual electrode extension or wire stick out;

FIG. 4 is a wiring diagram of the circuit or software program for converting the signal of FIG. 3 into a voltage signal representing the stick out resistance;

FIG. 4A is a wiring diagram of a modification of the diagram shown in FIG. 4;

PREFERRED EMBODIMENT

Figure 5:
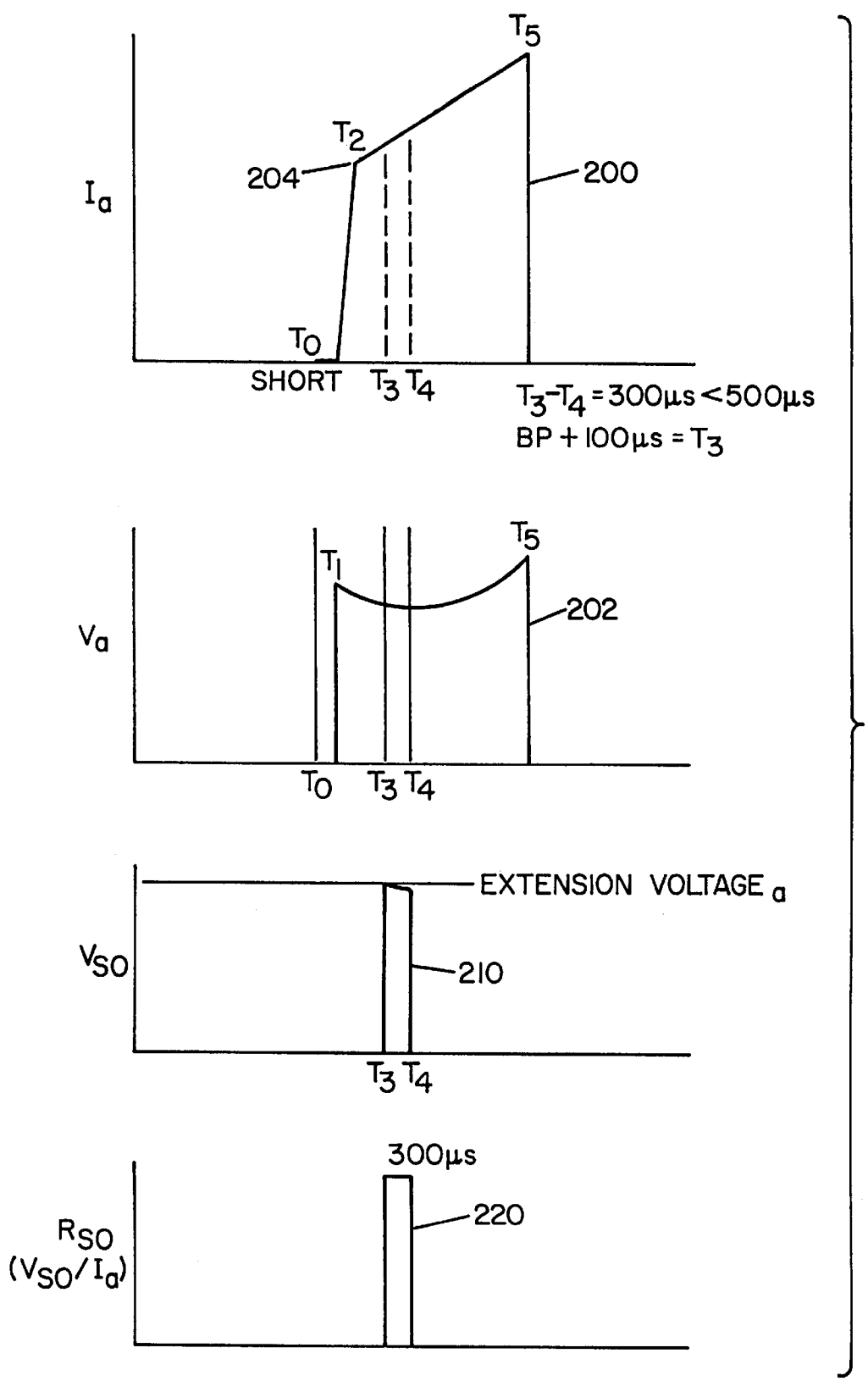
FIG. 5 is a series of graphs illustrating the operation of the circuits or programs illustrated in FIG. 3 and 4.

Referring now to the drawings wherein the showings are for the purpose of illustrating a preferred embodiment of the invention only and not for the purpose of limiting same, FIG. 1 shows a high frequency DC switching power supply PS for passing a welding current through welding wire 10 to workpiece 12 while the wire is supported in an electrical connector or holder 14. An appropriate wire feeder 16 pulls wire from a supply spool 18 at a rate determined by the setting of the power supply as adjusted by the operator or programmer. Holder 14 is connected to terminal 22 of the DC power supply PS to receive a DC pulse between terminals 20 and the opposite polarity terminal 22. The shape of the DC current pulse is determined by an appropriate wave shape circuit 30 having a current control 32 with an output 32d for adjusting the current of a welding cycle. This adjustment of current can involve changes in the maximum current, peak current, background current, etc. Wave shape circuit 30 is well known in the control of high frequency switching power supplies. An output voltage signal on line 34 varies during a weld cycle to control the shape of the current between electrode or wire 10 and workpiece 12. The invention is used in the joint between two plates; therefore, workpiece 12 is a molten metal puddle between the two spaced plates. In practice the plates are pipe sections having an open root joint whereby the puddle or bead defines the upper level of workpiece 12. The distance between holder 14 and the puddle or workpiece 12 is the wire stick out for the welding process. This stick out or electrode extension can be measured by the stick out measuring circuit disclosed in Stava U.S. Pat. No. 5,001,326 when using a short circuit welding process such as used in the preferred embodiment. Other known circuits can measure wire stick out or electrode extension, especially when other types of welding cycles are used. The stick out measuring mechanism is illustrated in FIGS. 2, 5, 6 and 7. Of course, even for an STT welder other measuring techniques could be used, such as a shorting frequency measuring device illustrated in FIG. 23. Since Stava U.S. Pat. No. 5,001,326 concentrates on a down chopper high frequency power supply, this power supply is illustrated in FIG. 1 for the purposes of explaining the present invention. Other high frequency switching power supplies are used for creating welding current between wire 10 and the molten metal puddle in a joint between two plates. Power supply PS is a switching device cycled at a rate over about 18 kHz and preferably about 20–40 kHz. Pulse width modulator 40 is standard for creating rapid, variable width current pulses in converters such as down choppers and inverters. Control line 42 shapes the output current pulse with short current pulses having a rate controlled by driving oscillator 44. Consequently, the voltage on line 42 indicates the width of the rapid current pulses allowed to pass through switch 50 at a high rate, such as over 18 kHz. In this manner, the welding current through wire 10 is controlled by the voltage on output line 34 from wave shape circuit 30, which circuit is illustrated in Stava U.S. Pat. No. 5,001,326 and is incorporated by reference herein. The pulse width controlling voltage on line 42 is a DC voltage level at the output of error amplifier 60 appropriately biased by resistor 62. An override or parallel circuit 70 is operated to maintain line 34 at zero voltage by the voltage on line 42. The input of error amplifier 60 is the voltage at the output of circuit 30, which is controlled by a plurality of switches used in an STT welder and generally shown in Stava U.S. Pat. No. 5,001, 326. Control of the wave shape does not form a part of the present invention. The current drawn from error amplifier 60 controls the voltage applied by line 42 to pulse width modulator 40 for controlling the magnitude of the current pulses created by oscillator 44. Pulse width modulator opens and closes set FET switch 50 to direct a current wave as shown in the upper curve of FIG. 6. Vertical lines represent the rapid current pulses constituting the STT wave shape. The STT welder utilizes a spatter control circuit 70 which is operated in response to an impending fuse by a signal on line 72. This fuse signal is created by a dv/dt premonition circuit 74 so the logic on output line 76 will render power switch 80 non-conductive immediately before a fuse is created during a short circuit or pinch pulse of a given weld cycle. Operation of switch 80 changes flow of the welding current through a small inductance inductor 82 from a generally high level current through switch 80 to a generally low level current through a snubber circuit 84. As the short circuit condition of a welding cycle is in progress, the measured dv/dt exceeds a set value to indicate an impending fuse. The logic on line 72 immediately shifts. Consequently, the welding current from switch 80 is shifted to a low level to reduce the energy released by the fuse explosion to thereby reduce spatter. This concept does not form a part of the improvement constituting the present invention, but is a part of the STT welder used in the preferred embodiment of the present invention.

Figure 6:
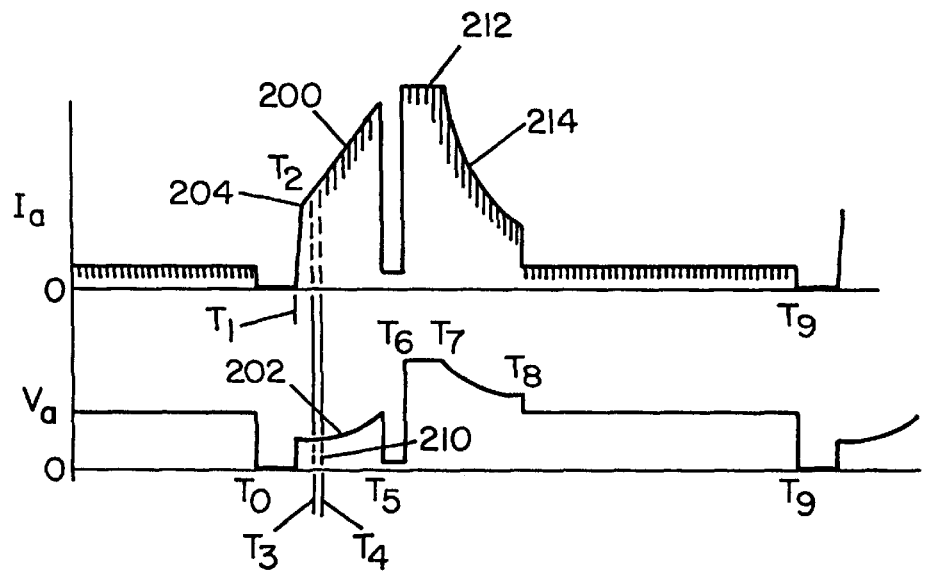
FIG. 6 is a graph of the current and voltage curves of a single cycle by the DC power supply as shown in FIGS. 1 and 1A when using the short circuit process of a STT electric arc welder.

The present invention senses the length of stick out or electrode extension a and controls current circuit 32 to either (a) control the amount of heat generated by the welding process during a root bead or (b) detect the position of wire 10 as it moves laterally between the spaced walls of the juxtapositioned plates during filling of the joint between the plates. The first aspect of the present invention is primarily applicable in laying the root bead in pipe welding. The second aspect of the present invention is primarily applicable during subsequent passes filling the joint where the wire is moved in a serpentine pattern. The STT was originally designed to use a down chopper power supply as shown in FIG. 1; however, the STT now uses an inverter 100 operated at over 18 kHz as shown in FIG. 1A. A representative inverter architecture for electric arc welding is disclosed in Blankenship U.S. Pat. No. 5,351,175. Either type power supply uses a wave shape control 30 and includes an arrangement for adjusting the various current levels as illustrated by current control 32 to provide the wave shape shown in FIG. 6. Inverter 100 has an appropriate input power supply, which may be a motor generator, but is shown as a three phase line voltage 102. This line voltage is first rectified to a DC link that inverter 100 switches at a high rate to create a current wave, which in the preferred embodiment is an STT short circuit wave as shown in FIG. 6. As an addition to the invention, wire 10 is a flux cored electrode B, as schematically illustrated in FIG. 1B. Such an electrode has an outer sheath 110 and a hollow core 112 filled with ingredients of a fluxing system and/or alloying particles. By utilizing a flux cored electrode for pipe welding in remote areas, the need for shielding gas is eliminated. This is an advantage in some remote sections of the world.

The invention relates to the concept of (a) measuring the stick out or electrode extension a and (b) using this measurement for controlling the heat in the root pass of a pipe welding operation. The root is between the edges of the plates. As will be explained later, the measurement of stick out a is also applicable for moving the weld head back and forth between the diverging side walls of the joint when filling the space between the side walls with molten metal. FIG. 2 illustrates a circuit similar to FIG. 2 in Stava U.S. Pat. No. 5,001,326 which is a software program or hardwired circuit for measuring stick out a and for allowing the welder to adjust or calibrate itself based upon a stick out reading made during a 5.0 sec start up by an operator. To accomplish this objective, stick out measuring circuit 120 is used to create a voltage in line 122, which voltage represents the stick out a during a DC welding cycle. The process used in the preferred embodiment is the STT cycle illustrated by the voltage and current curves in FIG. 6. These curves are generated by an STT welder using the inverter shown in FIG. 1A. Arc voltage $V_a$ is monitored at input 124 and is used to charge capacitor 130 through resistor 126 by operation of software switch 128 for short periods immediately after the break point current at time $T_2$ as shown in FIGS. 5 and 6. In practice, the delay after the break point is about 100 microseconds. Switch 128 is closed between times $T_3$ and $T_4$ during the short circuit condition of the welding cycle. Switch 128 is closed for a time less than 500 microseconds and preferably approximately 300 microseconds. Upon closing of the switch, capacitor 130 is charged to create a voltage on line 122. This voltage is representative of the running average of short voltage spikes or slices. These voltage spikes occur when wire 10 is shorted to the molten metal puddle 12. Consequently, the voltage on capacitor 130 is proportional to stick out because this voltage is measured while the current is the same magnitude cycle-to-cycle. Thus, voltage $V_{SO}$ is representative of stick out a. Of course, if other welding cycles are used, stick out voltage can be measured by a variety of circuits specific to the particular type of welding operation being performed. Current control circuit 32 in FIG. 1 could be directly responsive to the voltage in line 122; however, the voltage on this line is not only controlled by the length of the stick out, but is also controlled by other parameters, such as the diameter of the wire, the composition of the wire, the resistivity of the wire and the shielding gas to name a few. Thus, stick out in the present application is a length. However, the "stick out" being monitored and used in the invention has other controlling parameters. Voltage on line 122 for one welder using a certain weld wire may be a different value than the voltage for the same stick out length in another welding operation. Stick out is sensitive to variables and is used in this description as a general concept of measuring a voltage indicative of a representative stick out and variable with the length component during a specific welding operation. In view of these necessary variables, a circuit as shown in FIG. 2 is sometimes used. This circuit not only reads the voltage on line 122, which is generally length sensitive, but also the actual arc of the current $I_a$ during plasma boost at line 132. Thus, the variables are factored into the control signal. The voltages on lines 122 and 132 are directed to the inputs of multiplier circuit 134 which is, in practice, a software multiplier having an output 136 which is the average stick out voltage combined with the arc current measured at a selected time in the weld cycle. Thus, the voltage in line 136 is extension wattage and considers the variables of the welding process. The circuit shown in FIG. 2 is used to control the peak current $I_M$ during the power boost pulse. To teach control 32 of the desired welding current to be used during a specific welding process, a start up circuit 140 is used wherein software switch 142 is closed for prescribed time at the start of the welding cycle, such time is normally about 5.0 seconds. The extension wattage voltage on line 136 charges capacitor 150 through resistor 144 during the initial start up of the welding cycle to teach current control 32 the desired stick out for the total process. Circuit 140 also includes software switch 146 which switch is closing during the plasma boost pulse T6–T7. By using circuit 140, capacitor 150 is charged to a voltage indicative of the plasma boost wattage for the adjusted stick out at the start of the welding process. Sample and hold circuit 142 holds the voltage across capacitor 150 on output line 154 directed to the input of error amplifier 160. Error amplifier 160 creates an error signal in line 160 proportional to the reference wattage in line 154 and the actual wattage in line 136. This error signal is used to control the peak current $I_M$ only during the plasma boost pulse by switch 162. During start up, switch 162 is opened. Thereafter the signal on line 160a is the input 32a of control 32 when switch 162 is closed during the plasma boost pulse. The signal in line 162 is directed to input 32a so that variations in the voltage on line 136 will adjust the current in circuit 32 to change the current between wire 10 and puddle 12 during time T6–T7. At other times control 32 follows the settings for the STT curve of FIG. 6. By using circuit 140, control 32 is adjusted at the start of the welding operation for a preferred stick out. Thereafter, the stick out is monitored to adjust the welding current, either the total integrated current, the maximum current, the peak current or the background current as desired.

In accordance with the invention, the voltage on line 122 represents the stick out a for a given welding process. This voltage is used in the present invention to shift the weld current to the desired level based upon the magnitude of stick out voltage $V_{SO}$. The basic circuit representing this concept is illustrated in FIG. 3 which is the input portion of FIG. 2 that creates a voltage in line 122 for inputting to control circuit 32 on line 32a as shown in FIG. 1. The measured stick out is used to control the welding current, or at least portions of the welding current for adjusting heat in the weld puddle during the root pass of an open root welding process. As indicated before, the voltage on line 122 does not factor in the variables in the particular welding process being implemented; therefore, in accordance with one aspect of the invention, the voltage on line 122 is combined with the arc current. This is shown in FIG. 2. In practice, the circuit for combining these values is illustrated in FIG. 4. Dividing circuit 180 is a software circuit but may be a hardwired circuit. This circuit divides the stick out voltage by the arc current. As illustrated in FIG. 5, this arc current is the instantaneous arc current occurring when the voltage is being measured. Consequently, the voltage on line 182 is representative of the stick out voltage divided by the short circuit current between times $T_3$ and $T_4$ of the STT wave. The voltage on line 182 is stick out resistance, which parameter is a more accurate for control of the welding process. Stick out resistance $R_{SO}$ is used by control circuit 32 in the same manner as the stick out voltage $V_{SO}$ is used. In both cases, the signal on line 122 or the signal on line 182 is representative of stick out a. Throughout this description, stick out means stick out voltage or stick out resistance. The terms are used interchangeably in the implementation of the present invention. Current circuit 32 has a first input 32a for the stick out voltage and a second input 32b for stick out resistance. To assure that the voltage on line 32b($R_{SO}$) uses the same current as used for measuring the stick out voltage, the switch 128 is used to charge capacitor 184, as shown in FIG. 4. The voltage and current introduced to circuit 180 are voltages and currents measured during the same short time period of less than 500 microseconds and preferably about 300 microseconds directly after the break point in the short circuit condition. A modification of the circuit shown in FIG. 4 is shown in FIG. 4A where divider stage 180a divides arc voltage $V_a$ by arc current $I_a$ and is read during the arcing condition during time T1–T8. This gives the stick out resistance as the voltage on capacitor 184a in line 182a.

Figure 7:
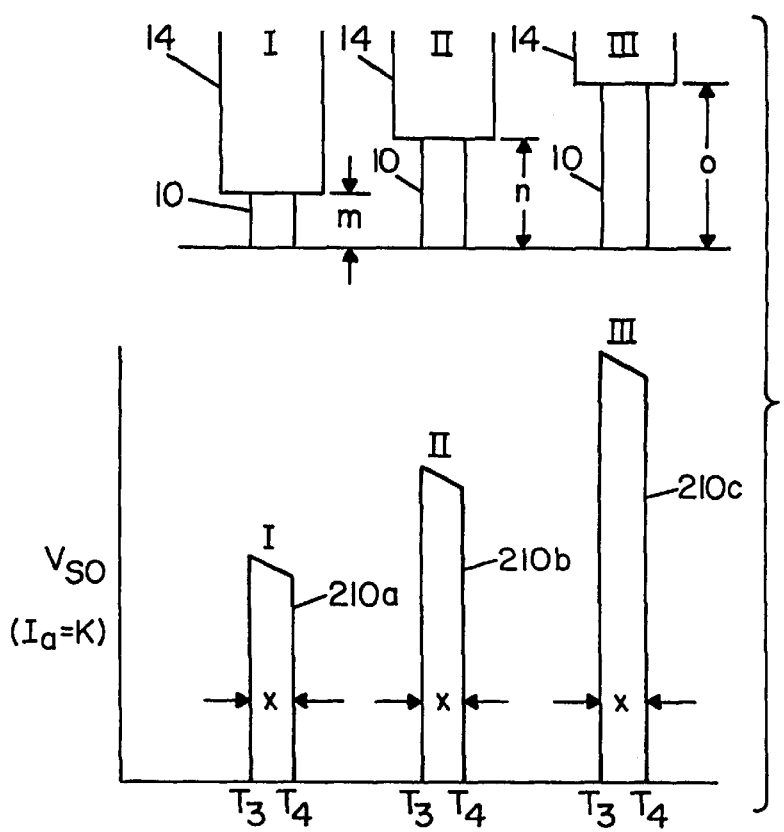
FIG. 7 is a chart illustrating the difference in the voltage signal created by the circuit in FIG. 3 for different wire stick out lengths.

The measurement of stick out voltage is dictated by the welding process being performed and the available parameters for obtaining a signal representative of stick out, whether it is voltage $V_{SO}$ or resistance $R_{SO}$. Since the preferred embodiment of the invention utilizes the STT arc welder, the stick out measuring circuit of Stava U.S. Pat. No. 5,001,326 is employed in the preferred embodiment. This circuit is known and is explained in the views constituting FIGS. 5–7. The current and voltage curves for the STT welder are illustrated in FIG. 6 wherein a weld cycle extends between times T0 and T9. At time T9, the weld cycle is repeated. At time T0, the voltage $V_a$ shifts to a low value indicating a short circuit between the molten metal ball on the end of the advancing wire and the molten metal puddle 12 already deposited in the weld joint. Until time T1, the current is maintained low. Thereafter, the current is controlled as indicated by pinch pulse 200 resulting in voltage pulse 202. At break point 204, occurring at time T2, the current shifts to a lower controlled slope for the remainder of the pinch pulse. Current at break point 204 is a fixed value. The switch 128 is closed between times T3 and T4. Time $T_3$ is delayed from time $T_2$ by about 100 microseconds. This provides a voltage pulse 210 which is relatively narrow and is created near break point 204. Thus, the weld current is always at the same level when voltage pulse 210 is created. When premonition circuit 74 indicates a fuse is imminent, pinch pulse 200 is shifted to the background current level at time T5. This current level is held until time T6 when a plasma boost pulse 212 is created by the wave shape circuit 30 shown in FIG. 1. This pulse has a maximum current and then a tail out current in portion 214. The vertical lines represent the high speed pulse from switch 50. The tail out of plasma boost pulse 212 is terminated at time T8. Thereafter, the background current is held to maintain the molten metal of the ball liquefied until a short circuit occurs at time T9. This is the same short circuit condition that started the cycle at time T0. The next welding cycle is thus started at time T9. The heat created in the welding operation is determined by integrating the current curve between times T6 and T9. This heat can be controlled by changing the peak or maximum current of the boost pulse 212 or the background current level between times T8 and T9. By adjusting the maximum current $I_M$ or the background current $I_B$ the heat in puddle 12 is changed to adjust the viscosity of the molten metal. Pinch pulses 200 and 202, together with the voltage spike or slice 210 are schematically illustrated in FIG. 5. By accumulating these spikes, the stick out voltage $V_{SO}$ is created for use in the invention. As explained earlier, the stick out voltage $V_{SO}$ is divided by the arc current $I_a$ to create a stick out resistance $R_{SO}$. The stick out resistance is shown as pulse 220 in the bottom graph of FIG. 5. Pulse 220 is accumulated to give the instantaneous stick out resistance for use in the present invention. Both the stick out voltage and the stick out resistance are indicative of the stick out length during the welding process. They are used in the present invention for controlling the heat in the puddle, especially during the root pass of the welding process. These same values are used to control the oscillation of the weld head during filling of the joint between two adjacent plates. Assuming that the current is constant between times $T_3$ and $T_4$, which is generally true, voltage spikes 210a, 210b and 210c are representative of variable stick out lengths m, n and o in examples I, II and III of FIG. 7. The corresponding voltage spikes shown in the chart of FIG. 7 are used as the stick out parameter.

Figure 8:
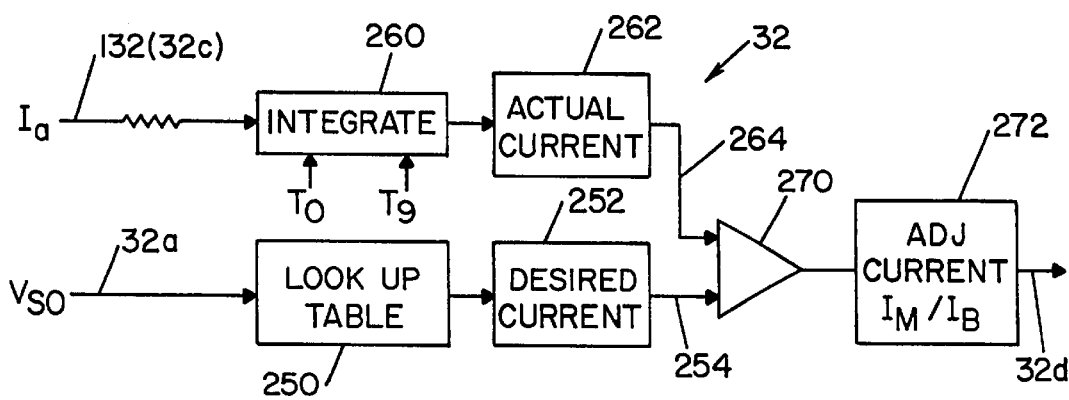
FIG. 8 is a block diagram showing the software program used in a microprocessor for practicing the preferred embodiment of the present invention.

In accordance with the present invention, stick out voltage $V_{SO}$ on line 122 is directed to input 32a of current control circuit 32. This circuit is schematically illustrated in FIG. 8. The stick out voltage on line 32a is directed to the input of a look up table, ROM, PROM or other memory device 250, which device outputs a desired current 252 correlated with the input stick out voltage. Output 254 is a voltage indicative of the desired current based upon the measured stick out voltage $V_{SO}$. In the preferred embodiment of the invention, arc current on line 132 is directed to circuit 32 on line 32c. In circuit 32, the arc current is integrated by integrator 260 between times T0 and T9. This gives the actual current of the welder for a welding cycle. Consequently, the voltage on line 264 represents the actual current which is one input to error amplifier 270. The other input is the desired current on line 254. Output 272 of amplifier 270 is the output 32d of circuit 32. the voltage on line 32d controls the actual current during subsequent welding cycles. Thus, as the stick out increases, the heat in puddle 12 decreases. This inverse relationship is programmed into look up table 250. Wave shape circuit 30 forms the current wave shape as shown in FIG. 6 using the desired current levels to shift the actual integrated current toward the desired value. Current adjusting circuit or stage 272 changes the maximum current $I_M$, the background current $I_B$ or both currents according to the desired system programmed into stage 272. In the preferred embodiment, background current $I_B$ is adjusted to maintain the desired heat in puddle 12.

Figure 9:
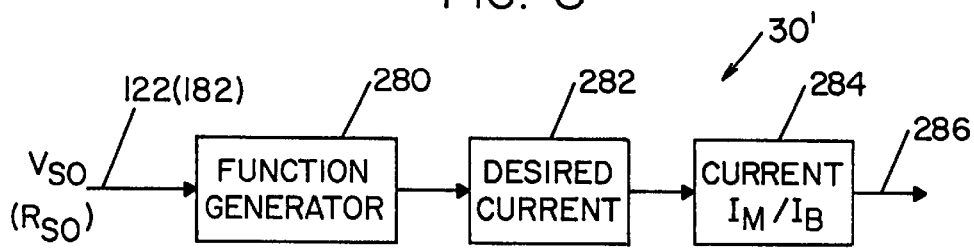
FIG. 9 is a block diagram showing the software program used in a modification of the preferred embodiment of the present invention.
Figure 10:
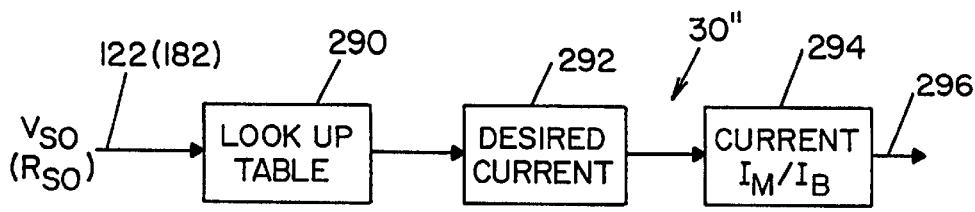
FIG. 10 is a block diagram showing still a further modification of the present invention.

FIGS. 9–12 are modifications of the preferred embodiment of the present invention for controlling electric arc welders by the stick out length as represented by either stick out voltage $V_{SO}$ or a stick out resistance $R_{SO}$. These software diagrams are schematically illustrated and can be implemented by various software techniques. FIG. 9 illustrates current control circuit 30' wherein a function generator 280 is used instead of the programmed look up table 250. This function generator may be analog or digital device and can have an input which is either the stick out voltage $V_{SO}$ or the stick out resistance $R_{SO}$. The output of the function generator is the desired current of stage 282. The level at this stage controls the welding current as indicated by block or stage 284 having output 286. This output value is directed to the controller of the arc welder, such as the wave shape circuit 30 of the welder in FIG. 1. In a like manner, FIG. 10 illustrates a control circuit 30" using a programmed look up table 290 to create a desired current at stage 292 for controlling the current adjusting stage 294. The signal on output line 296 is directed to the controller of the welder. Both FIGS. 9 and 10 indicate that either the voltage or resistance of the stick out can be used as a direct control of the welder. There is no use of an actual current feed back. These embodiments of the invention are open loop controls where the current is an absolute figure determined by the output of function generator 280 or look up table 290. In practice the closed loop system shown in FIG. 8 is used. The systems shown in FIGS. 8–10 are implemented by software in a microprocessor; however, they can be implemented by analog circuits.

Figure 11:
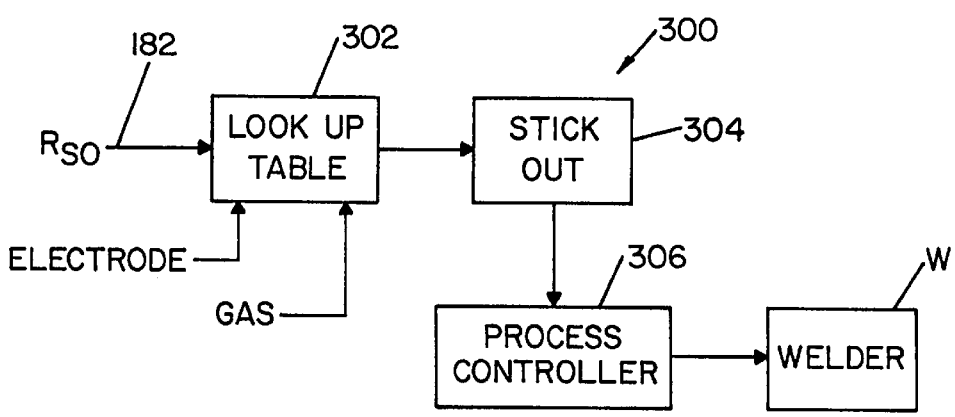
FIG. 11 is a block diagram showing the software program and circuit for using a signal created by the circuit in FIG. 4 for use in controlling the welder.
Figure 12:
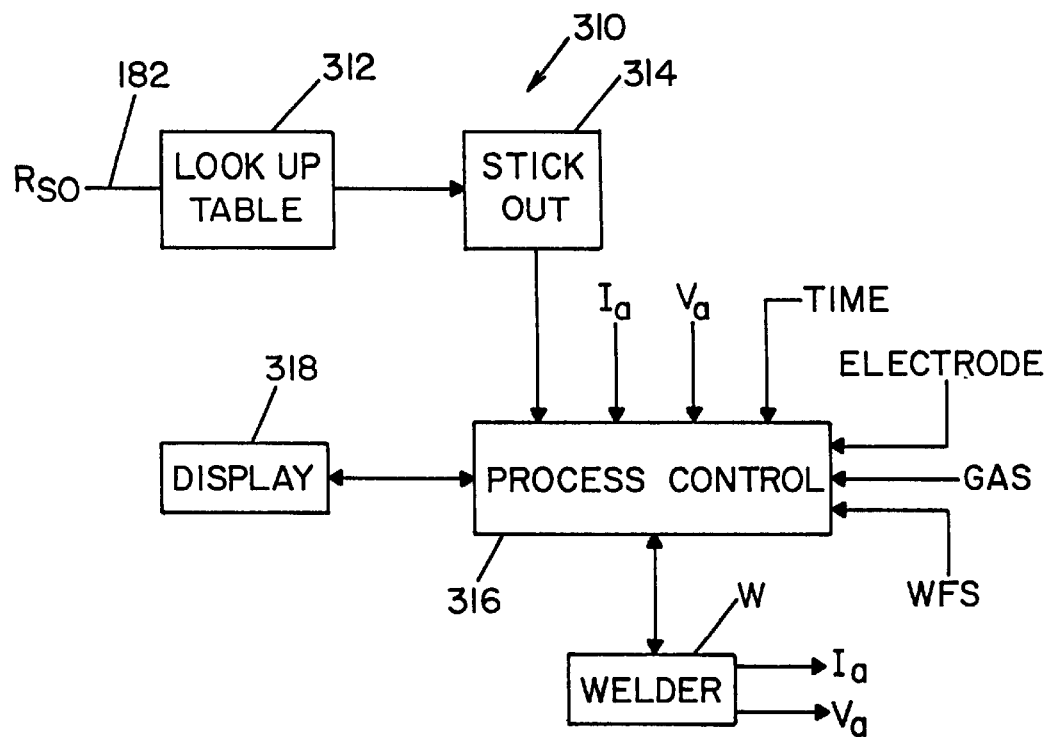
FIG. 12 is a block diagram showing a software program and control circuit of the type illustrated in FIG. 11 utilizing further parameters beyond the signal created by the circuit and/or program of FIG. 4.

Stick out resistance contains more information and is a more precise parameter representative of stick out. Consequently, welder control systems shown in FIGS. 11 and 12 use the stick out resistance $R_{SO}$ as the measurement of stick out. In FIG. 11, circuit 300 has a look up table 302 having an input 182 which is the real time variable stick out resistance. This table is modified by a variety of parameters, such as the electrode composition and size, the shielding gas and other variables. These variables shift look up table 302 to adjust for the additional parameters. The output of all of these parameters from the programmed look up table is stick out at stage 304. In accordance with the present invention the stick out signal from stage 304 is preferably digital and is directed to controller 306 of welder W. Thus, the variable for the controller is the stick out resistance measured in accordance with the present invention. Circuit 310 in FIG. 12 follows by the stick out resistance value on line 182. This value is directed to a programmed look up table, which table is indexed by the parameters shown in FIG. 11 to create a stick out signal at stage 314. The magnitude of this signal is directed to the controller 316 of welder W. Process controller 316 also includes inputs such as current, voltage, time, electrode, shielding gas and wire feed speed. All of these parameters are used to control the welding process executed by welder W. As in FIG. 11, circuit 310 adjusts the standard controller 316 for electric arc welder W by a parameter representing wire stick out. In these two examples, the parameter is stick out resistance $R_{SO}$. Of course, the parameter could be stick out voltage $V_{SO}$.

Figure 13A:
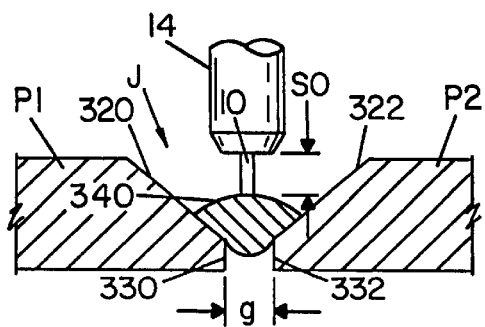
FIGS. 13A and 13B are schematic illustrations of a welding operation utilizing the present invention wherein the gap in the joint is relatively narrow.
Figure 13B:
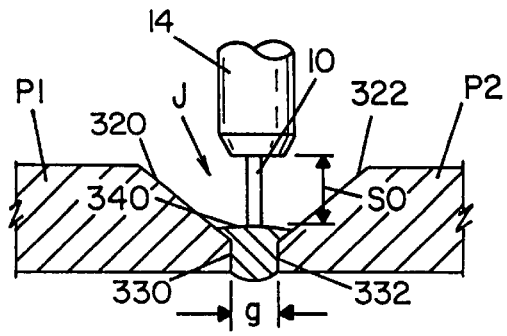
Figure 14A:
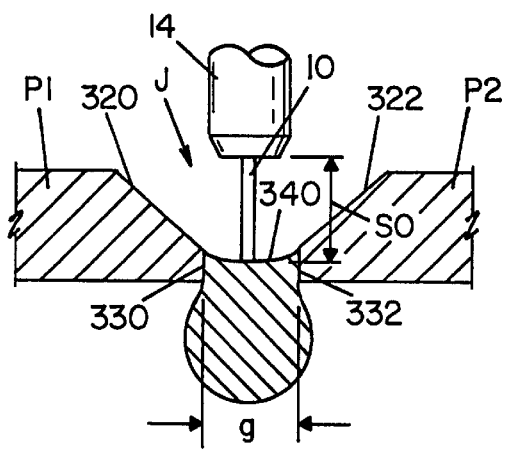
FIGS. 14A and 14B are schematic illustrations of a welding operation utilizing the present invention wherein the gap in the joint is relatively wide.
Figure 14B:
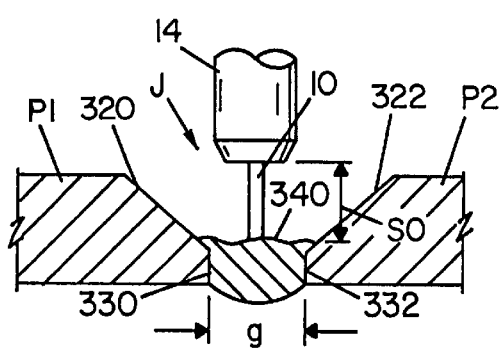

The present invention employs stick out length, either stick out voltage $V_{SO}$ or stick out resistance $R_{SO}$, to control the welding current for adjusting the heat in the puddle of an open root welding process as used in pipe welding. The advantage of the present invention is illustrated in FIGS. 13A, 13B, 14A and 14B which show weld joint J between spaced plates P1 and P2. In practice, adjacent ends of pipe sections form joint J. Joint J includes diverging walls 320, 322 terminating in generally vertical walls 330, 332 defining a gap g, which gap is the open root of the joint. As the joint is being welded with the first pass at the root, changes in the magnitude of gap g seriously affect the laying of the root bead by an automatic welder. The present invention controls the heat in molten puddle or bead 340 according to the size of gap g. In FIGS. 13A and 13B, gap g is relatively narrow. Consequently, puddle 340 does not penetrate into the gap. This problem is shown in FIG. 13A. Thus, the puddle accumulates above the gap to increase the height. This action reduces the stick out SO between the end of holder 14 and the top of puddle 340. Consequently, there is an insufficient joining between walls 320, 322. In accordance with the invention, stick out SO is measured as a stick out voltage or stick our resistance and the look up table, ROM or other function generator creates a signal corresponding to an inverse relationship. The less the measured stick out the more the welding current and vice versa. By increasing the welding current, puddle 340 penetrates into gap g and joins plates P1 and P2 between walls 330, 332 as shown in FIG. 13B. Thus, when the gap is small, the heat of the puddle is increased to reduce metal viscosity and allow better penetration during the root pass. In a similar manner, if walls 330, 332 are too wide indicating a large gap g, as shown in FIG. 14A, molten metal puddle 340 falls through the gap into the inside of the pipe. When the gap increases, the stick out increases. In accordance with the invention, the inverse relationship exists between the stick out and the heat created in the puddle by the welding current; therefore, the weld current is reduced to create the welding puddle shape as shown in FIG. 14B. As shown in FIGS. 13 and 14, the invention maintains the desired welding current for creating the proper heat in puddle 12 to compensate for changes in the spacing between the plates being welded. This is an extremely advantageous welding process for the root bead in an open root joint. The invention, thus compensates for the differences in the gap when laying the initial root bead in a pipe welding environment, especially when using the short circuit weld process obtained when using the STT electric arc welder. Of course, the invention can be used with other electric arc welders, whereby the stick out is measured and the current is inversely controlled according to the measured stick out.

Figure 15:
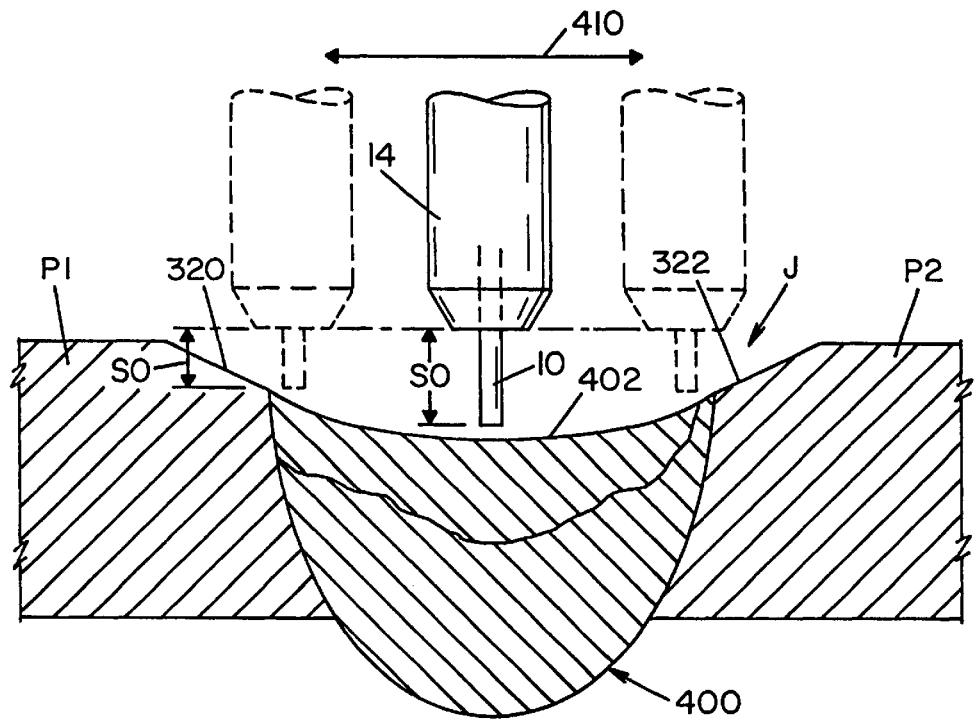
FIG. 15 is a schematic diagram illustrating a second aspect of the preferred embodiment of the present invention wherein the signal created by the circuit or program illustrated in FIG. 3 or the signal from the circuit or program illustrated in FIG. 4 is used to control the lateral movement of the weld head when laying subsequent beads in the joint shown in FIGS. 13 and 14.

Although the invention is particularly applicable to laying the root bead in joint J, it can also be used for subsequent passes where the welding operation fills joint J above the original root pass. During the root pass, the weld head mechanism is held in a single position above gap g. In subsequent passes, the weld head moves holder 14 transversely back and forth in a serpentine pattern as the weld head moves around joint J of the pipe sections between plates or sections P1, P2. This transverse action is schematically illustrated in FIG. 15 where weld bead 400 includes an upper molten metal puddle 402. The weld head is moved back and forth as indicated by arrow 410 to lay metal in joint J to join plates P1 and P2 as shown in FIG. 15. As holder 14 moves back and forth, stick out SO becomes small at the outside edges of walls 320, 322 and is larger toward the center. Thus, the stick out shifts from a low value to a high value and back to a low value with movement of the weld bead across joint J. Since the invention allows control of the welder by measuring the stick out, the invention is also used as an improvement in the mechanism for moving the weld head back and forth during welding of joint J.

Figure 16:
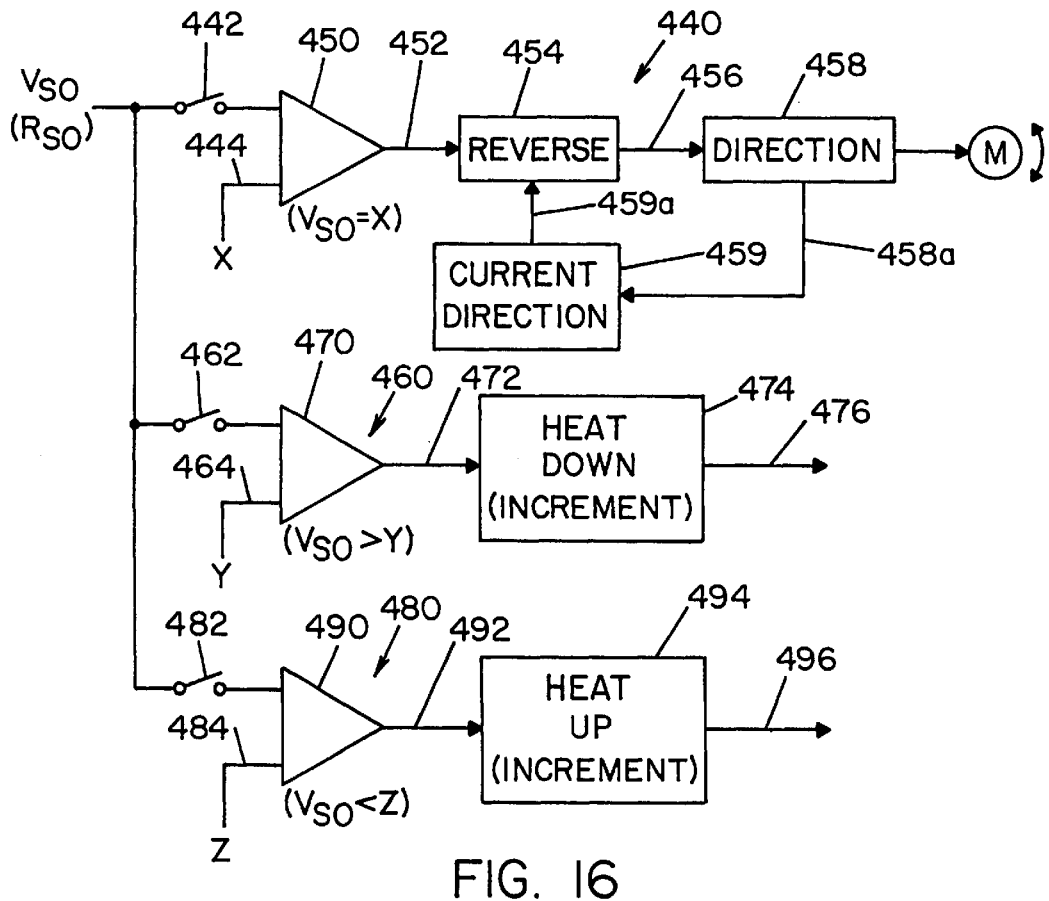
FIG. 16 is a combined wiring diagram and block diagram illustrating a circuit and/or software program for practicing the aspect of the invention as illustrated in FIG. 15.
Figure 17:
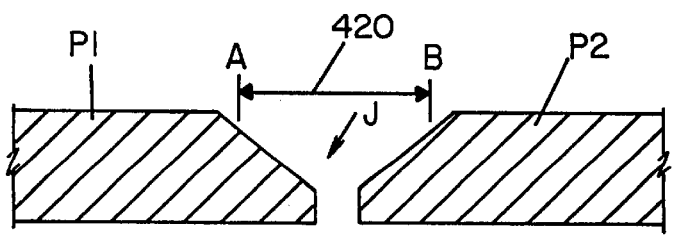
FIG. 17 is a cross sectional view of an open root joint to be welded with a weld head control mechanism of the prior art.
Figure 18:
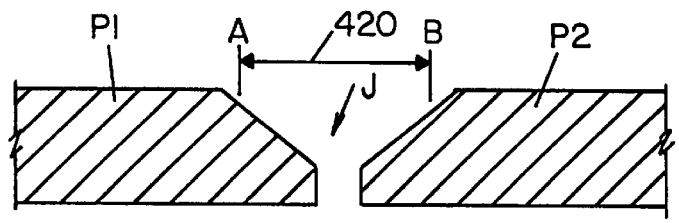
FIG. 18 is a series of views as shown in FIG. 17 illustrating a problem in the prior art.
Figure 18:
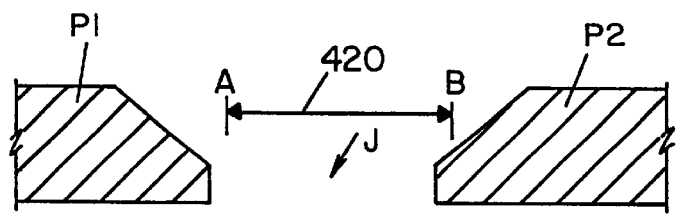
Figure 18:
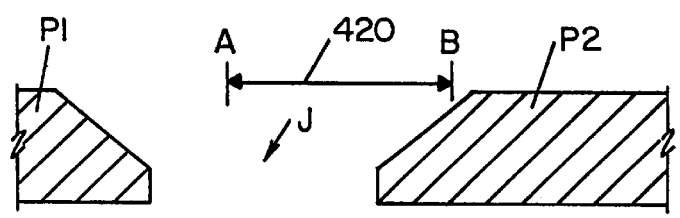
Figure 19:
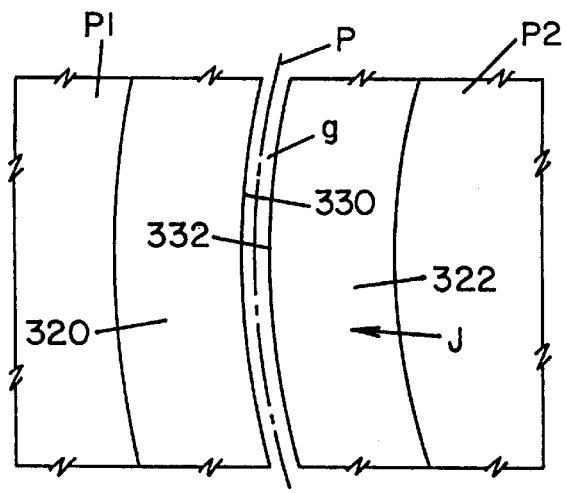
FIG. 19 is a partial top plan view of an open root joint having a curved path P.

In FIG. 17, the prior art welding procedure is illustrated. Plates P1 and P2 are assumed to have a joint J which is accurately positioned in a fixed weld path and has a fixed root gap. The head oscillates back and forth between points A and B as indicated by arrow 420. Assuming joint J remains aligned with the proper path and the gap remains the same width, adequate welding can be accomplished without manual intervention. This prior art concept is also shown in FIG. 18. The top view depicts a properly aligned joint to produce good results. As the gap increases, or the joint is outset to the side of the desired path, the movement of the weld head between points A and B will not produce a quality weld. Manual intervention is necessary to track joint J to effect the desired weld joint. This problem is serious when the gap is too wide or drastically offset as shown in the bottom two views of FIG. 18. In accordance with the present invention, as the weld head moves back and forth in the manner shown in FIG. 15, the stick out or electrode extension is measured and the operation of the weld head drive is modified as illustrated in FIG. 16. The weld head shown as holder 14 is moved back and forth by motor M. Circuit 440 reverses the transverse direction of motor M when the stick out reaches a preselected magnitude indicated as length X. Switch 442 directs a voltage level indicative of stick out to one input of comparator 450. The other input is adjusted to a voltage representing the desired stick out length X. Output 452 changes logic when the stick out reaches length X. This logic signal change activates reversing switch 454 to give a direction reversing signal in line 456. The direction of motor M is reversed to move the weld head in the opposite transverse direction. The head is moved along joint J to create a serpentine pattern. When the direction has been changed, a signal in line 460a activates direction control 462 to change the logic on line 462a. Thus, when the welding head reverses direction, circuit 462 resets the reverse switch 454 awaiting a new detection of a stick out length equal to X. By closing switch 442, the welding head moves back and forth across joint J as the welding process travels along joint J. Of course, X can change as weld bead 400 grows by successive weld passes so a greater distance is created between the reversal points. During the back and forth movement of the welding head, it may be desired to increase or decrease the amount of heat at different transverse locations in the weld head. Greater heat is helpful at the outside edges of joint J and lesser heat is needed in the center of the joint. To accomplish this objective, the circuit shown in FIG. 16 includes two additional control branches. In branch 460, switch 462 compares the stick out signal with a signal in line 464 by a comparator 470. When the stick out voltage is greater than a level indicated as Y, a signal appears in output 472 of comparator 470. This starts a downward incrementation of input heat by gradually reducing the current through an incrementing current control 474 to give a signal 476 for adjusting current of the welding process. In a like manner, branch 480 is activated by closing switch 482 that combines with the value on line 484 to control comparator 490 so that an output signal is created in line 492 when the stick out is less than Z. Thus, as the weld head moves closer to the edges, the heat is incremented by incrementing current control circuit 492 to increase the current signal in line 496. By using branches 460, 480, the heat created in the passes after the root pass is controlled by the stick out. The stick out decreases when the weld head moves close to the edge. Thus, the heat is increased. As the weld head moves toward the center of the joint, the heat is incremented down. This aspect of the present invention controls heat, but is not used to control the root pass in an open root welding operation as described in FIGS. 1–14. By using the direction reversing circuit 440, the weld head will track path P even when the path is curved as shown in FIG. 19. As the weld head moves along the path P, it reverses direction upon reaching a particular outboard position in joint J. The reversal is not at a fixed point as shown in FIGS. 17 and 18. Thus, the present invention can be used for seam tracking even when there is no open root. The diverging sides between plates P1, P2 are used to define reversal points.

Figure 20:
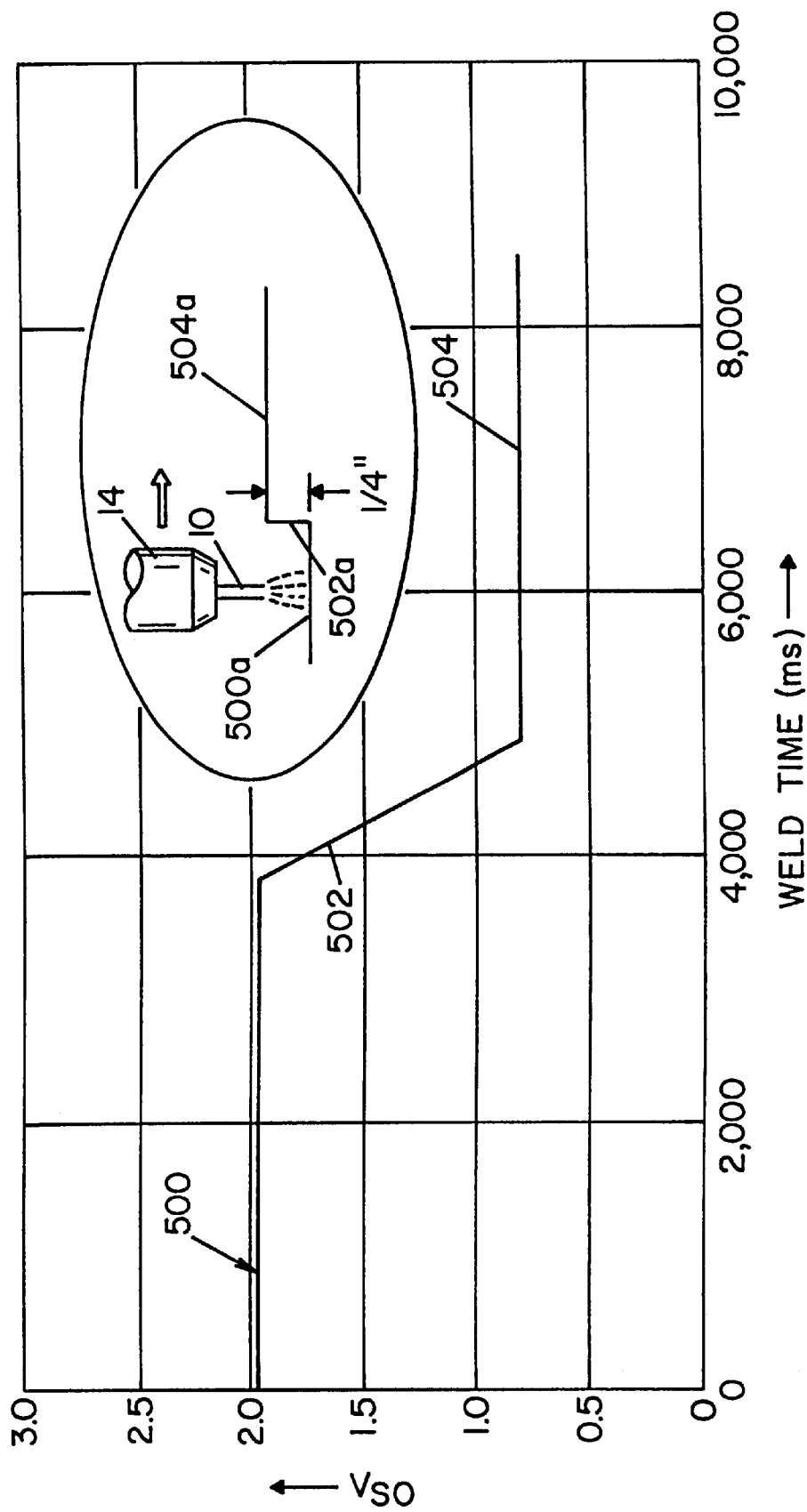
FIG. 20 is a graph with a pictorial insert illustrating changes in the signal as created by the circuit or program illustrated in FIG. 3 upon changes in the stick out.
Figure 21:
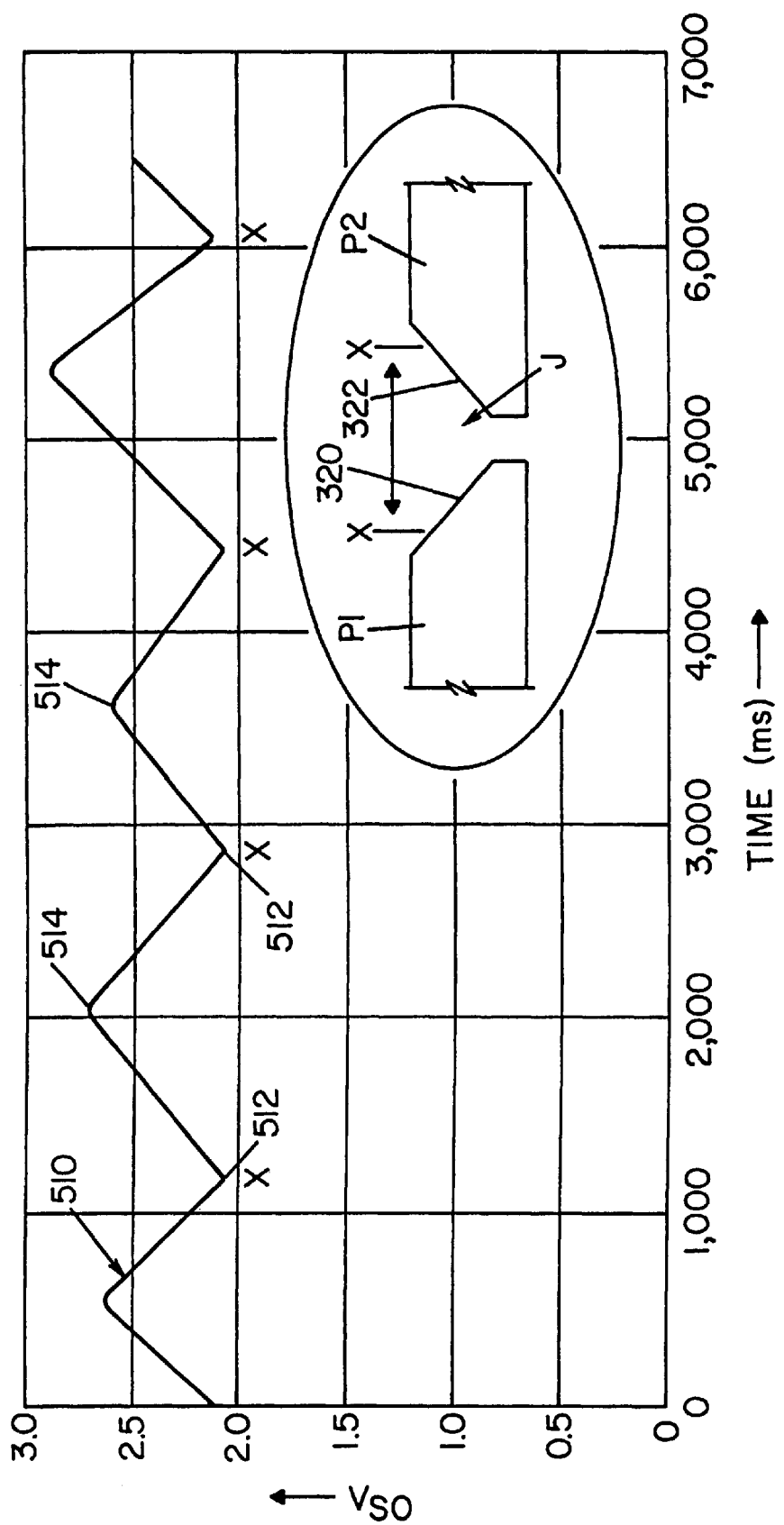
FIG. 21 is a graph of a pictorial insert showing the operation of the present invention when using the concept schematically illustrated in FIG. 15 and in the top portion of the wiring diagram shown in FIG. 16.
Figure 22:
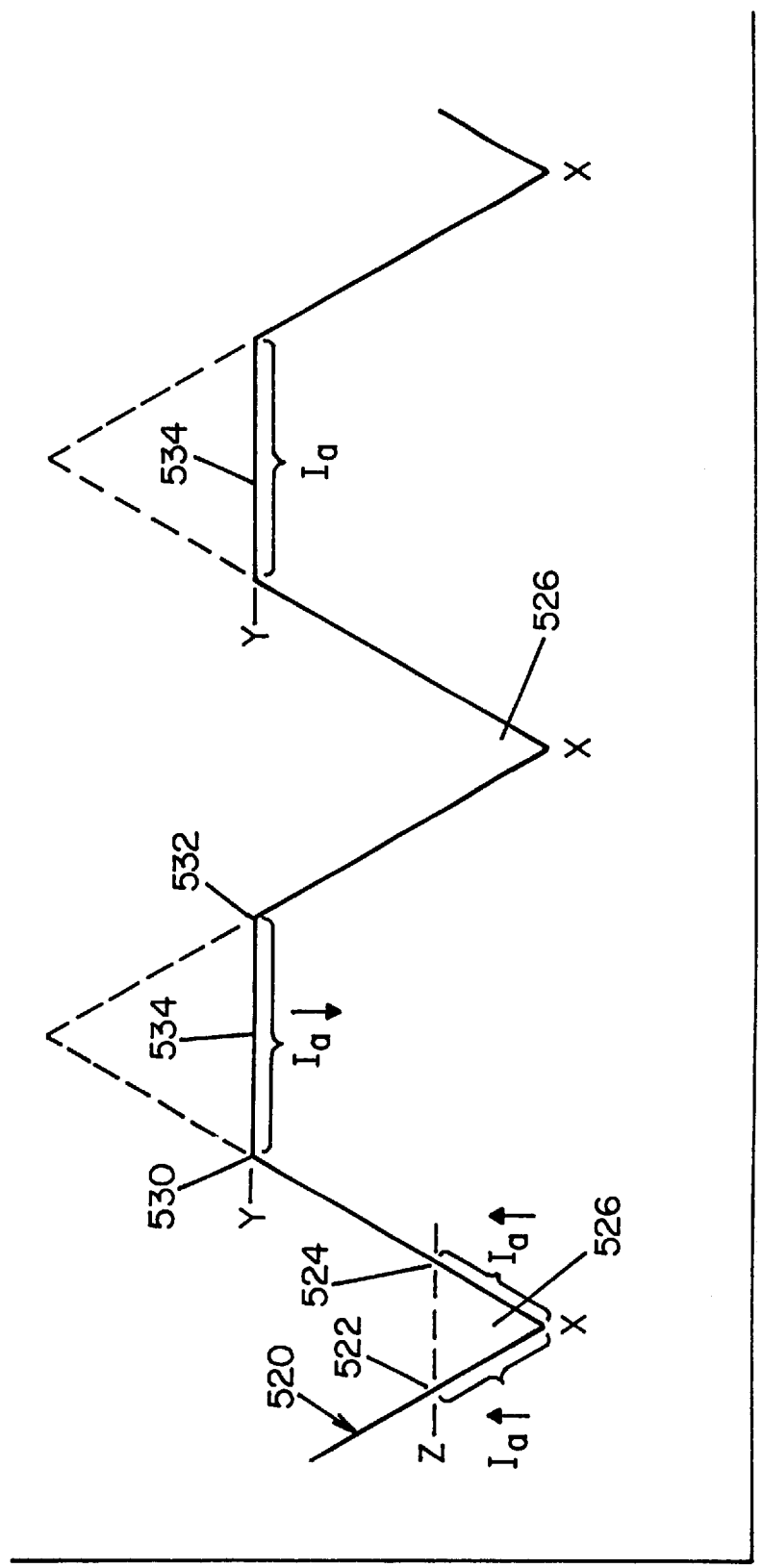
FIG. 22 is a graph similar to the graph shown in FIG. 21 utilizing the full implications of the wiring diagram illustrated in FIG. 16; and, FIG. 23 is a wiring diagram of a circuit for processing a signal representative of the stick out using a scheme different than illustrated in FIG. 3.

FIG. 20 shows an operating characteristic of the invention. Curve 500 has a first stick out voltage at about 2.0 volts until section 502. The stick out voltage then shifts to approximately 0.75 volts. This curve represents the operation of the present invention. The weld head moves along a weld puddle 500a with a first height and then reaches an area 502a where the puddle 504a has a second height, which is ¼inch higher than the height of puddle 500a. When this change in puddle height occurs, the stick out drastically reduces and the stick out voltage is reduced correspondingly. This reduced voltage is used in a root pass to increase the current as the voltage decreases. This inverse relationship is preferably a straight line; however, it can be a curve to obtain any desired effect. Another graph is shown in FIG. 21. Curve 510 shows the stick out voltage as the weld head moves back and forth between walls 320, 322 of joint J. As the stick out decreases, it ultimately reaches the low stick out indicated by the value X. This causes a reversal at point 512 until the weld head reaches the opposite diverging wall. In between, the stick out reaches a high level 514 indicating the center of the joint J, assuming that the joint is not substantially filled with molten metal. Curve 510 represents the embodiment of the invention wherein the stick out is used to reverse the direction of the weld head as it progresses along path P of joint J. The invention is used for tracking and filling joint J during the subsequent passes in a pipe welding process. A third graph is shown in FIG. 22. Curve 520 is followed when all three switches 442, 462 and 482 of FIG. 16 are closed. As the weld head moves back and forth across joint J, the stick out voltage decreases until the direction reversing point X. Inbetween the reversal points, the stick out voltage gradually increases and decreases as shown in FIG. 21. When the stick out voltage reaches a level Z at point 522, the puddle heat starts incrementing up by increasing the welding current. This incrementing of the weld current occurs in area 526 of curve 520 until point 524 is reached. In a like manner, as the weld head moves toward the center of joint J, the stick out may reach the level Y at point 530. As long as the stick out voltage tends to increase above point 530, the welding current is incrementally reduced to reduce the heat in the puddle. Area 334 represents this action which is retained until the stick out is reduced below level Y at point 532. Thus, weld puddle temperature control can be used during subsequent weld passes in joint J. However, the basic advantage of the invention is set forth and explained with respect to FIGS. 13 and 14.

Figure 23:
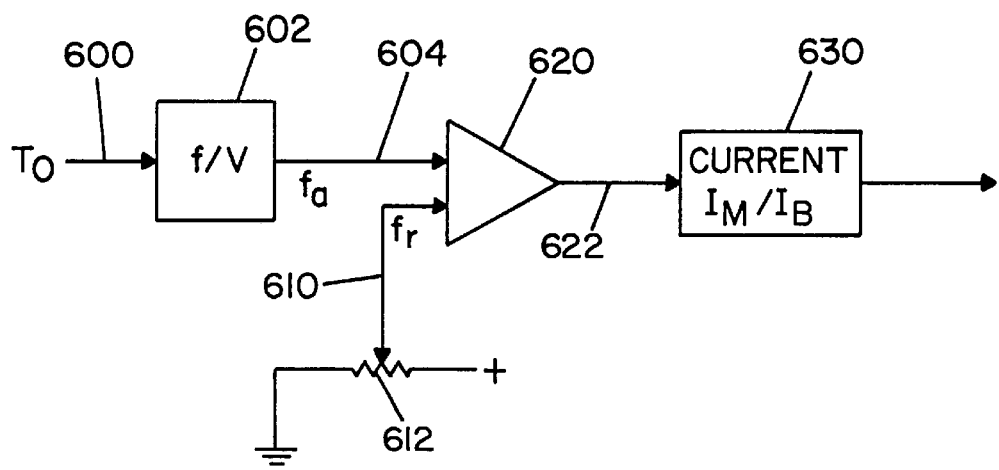

It has been found that the shorting frequency in an STT welder, i.e. having a cycle as shown in FIG. 6, is a function of stick out. By measuring the shorting frequency by recording shorts at time T0, the stick out can be determined and used in practicing the invention. This concept is illustrated in FIG. 23. Pulses in line 600 are the pulses created at each successive short circuits in the STT curve of FIG. 6. A frequency to voltage converter 602 creates a voltage in line 604 based upon the shorting frequency of the STT. This voltage, representative of the stick out length is the "stick out" as used in this description. This voltage is used to control weld current. In the illustrated embodiment, actual frequency $f_a$ is compared with a reference frequency voltage $f_r$ in line 610 as adjusted by potentiometer 612. Error amplifier 620 creates an error signal in line 622 for controlling the current 630 to adjust the current to the desired level set by potentiometer 612. This will operate as shown in FIGS. 13 and 14. The use of the shorting frequency in the STT welder is another circuit concept for measuring stick out for use in the present invention.

Having thus described the invention, it is claimed:

1. An electric arc welding apparatus for depositing molten metal from an advancing welding wire into a weld puddle in a joint between two juxtapositioned plates, said joint extending in a welding path and being formed by converging walls, said apparatus comprising: a contact holder with a wire outlet, a switching power supply directing welding current to said wire as said wire advances from said outlet toward said joint, said advancing wire defining an electrode stick out between said contact holder and said weld puddle, a circuit for sensing the length of said stick out, a weld head for moving said wire in a given direction transverse to said joint, means for reversing the direction of the weld head and thus said wire when said sensed stick out length is reduced to a given value at the edge of said joint and means for repeating said moving step alternately in opposite directions whereby said wire follows said welding path in a serpentine pattern.

2. Apparatus as defined in claim 1, wherein said switching power supply is an inverter.

3. A method for depositing molten metal from an advancing welding wire into a weld puddle in a joint between two juxtapositioned plates, said joint extending in a welding path and being formed by converging walls, a contact holder with a wire outlet, said method comprising:

(a) directing welding current to said wire as said wire advances from said outlet toward said joint;

(b) sensing the length of the stick out of said wire;

(c) moving said wire in a given direction transverse to said joint;

(d) reversing the direction of said wire when said sensed stick out length is reduced to a given value at the edge of said joint; and, (e) repeating said moving act alternately in opposite directions whereby said wire follows said welding path in a serpentine pattern.

4. The method as defined in claim 3, wherein said directing act is performed by a switching power supply.

5. An electric arc welding apparatus for depositing molten metal from an advancing wire into a weld puddle in a joint between two juxtapositioned plates, said joint formed by converging side walls, said apparatus including means for moving said advancing wire transversely across said joint in a generally serpentine pattern with direction reversing at each of said sidewalls, a measuring circuit for creating a stick out signal proportional to the stick out of the wire and a device for reversing the direction of said wire when said sensed stick out reaches a given low value.

6. An electric arc welding apparatus as defined in claim 5, including means for reducing the welding current through said wire when said sensed stick out is greater than a given high value.

7. An apparatus as defined in claim 5, including means for increasing the welding current through said wire when said sensed stick out is less than a given value.

8. An apparatus as defined in claim 5, wherein said stick out signal is a voltage proportional to the stick out length.

9. An apparatus as defined in claim 5, wherein said plates are the ends of two pipe sections.

10. A method for depositing molten metal from an advancing wire into a weld puddle in a joint between two juxtapositioned plates, said joint formed by converging side walls, said method comprising:

(a) moving said advancing wire transversely across said joint in a generally serpentine pattern with direction reversing at each of said side walls;

(b) creating a stick out signal proportional to stick out of the wire; and, (c) reversing the direction of said wire when said sensed stick out reaches a given low value.

11. A method as defined in claim 10, including reducing the welding current through said wire when said sensed stick out is greater than a given high value.

12. A method as defined in claim 11, including increasing the welding current through said wire when said sensed stick out is less than a given value.

13. A method as defined in claim 10, including increasing the welding current through said wire when said sensed stick out is less than a given value.

* * * * *